F. B. SEELING.
FEED TROUGH.
APPLICATION FILED JAN. 5, 1917.
1,234,496.
Patented July 24, 1917.
3 SHEETS—SHEET 1.
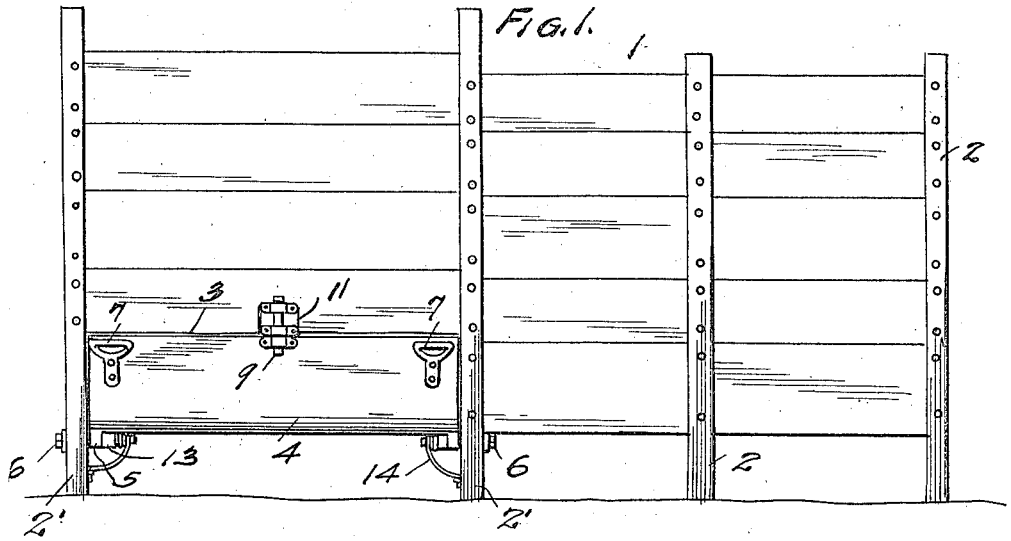
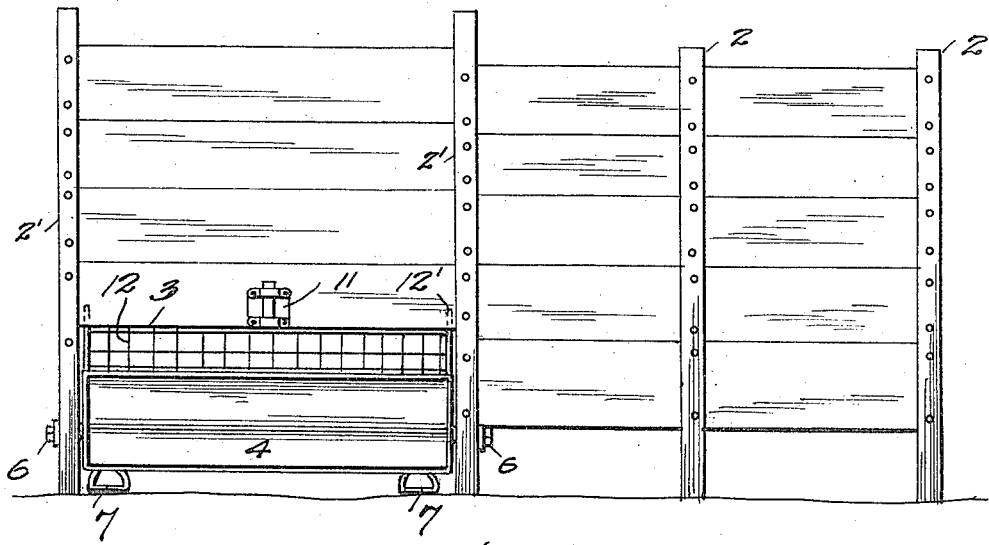
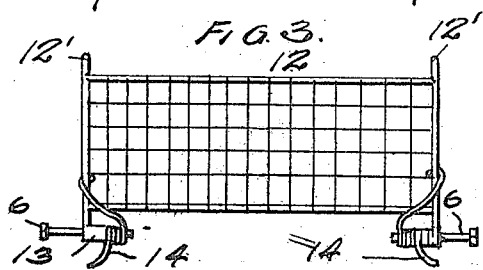
INVENTOR
Frederick B. Seeling
by
J. H. Adriaans
Attorney.

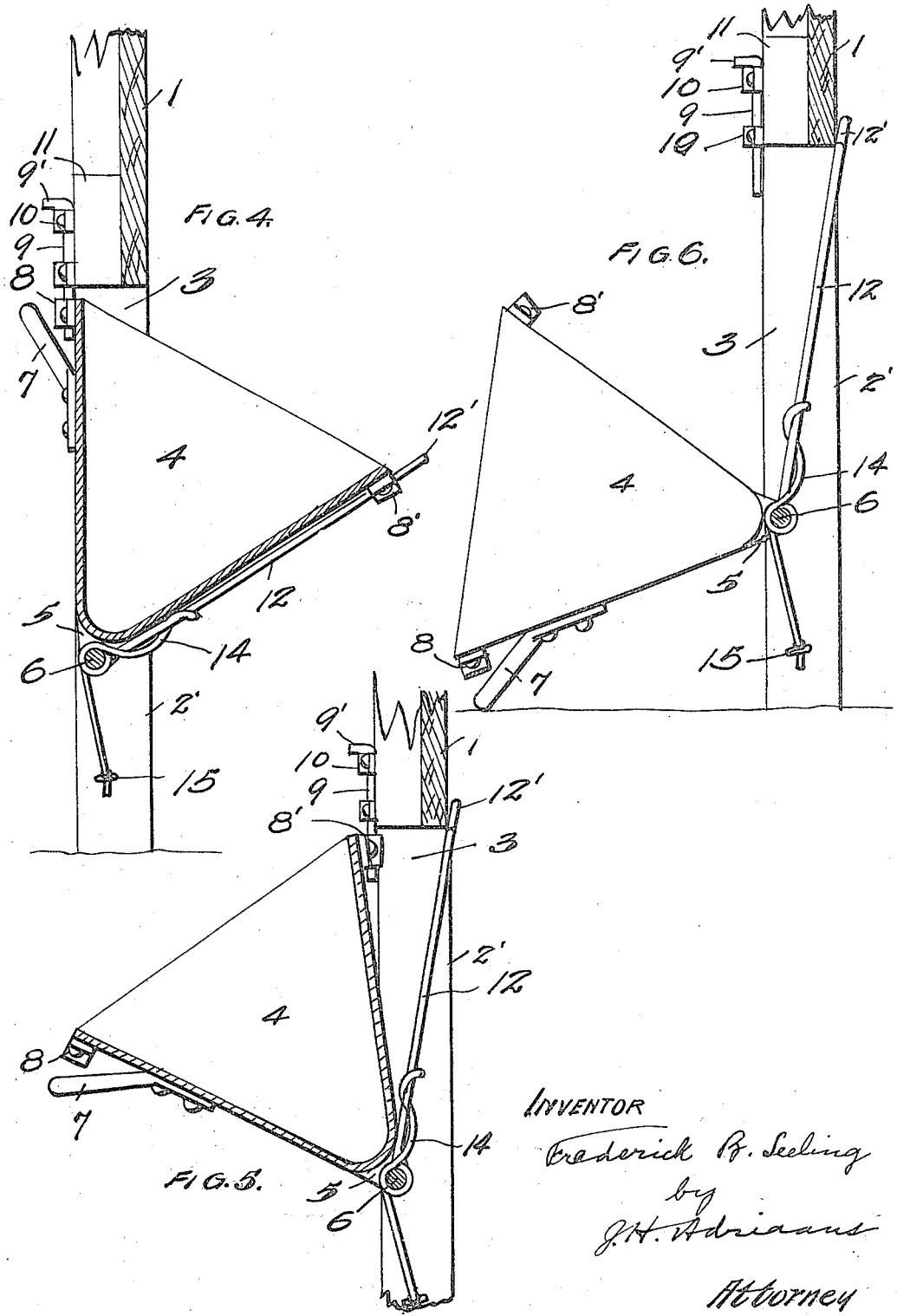

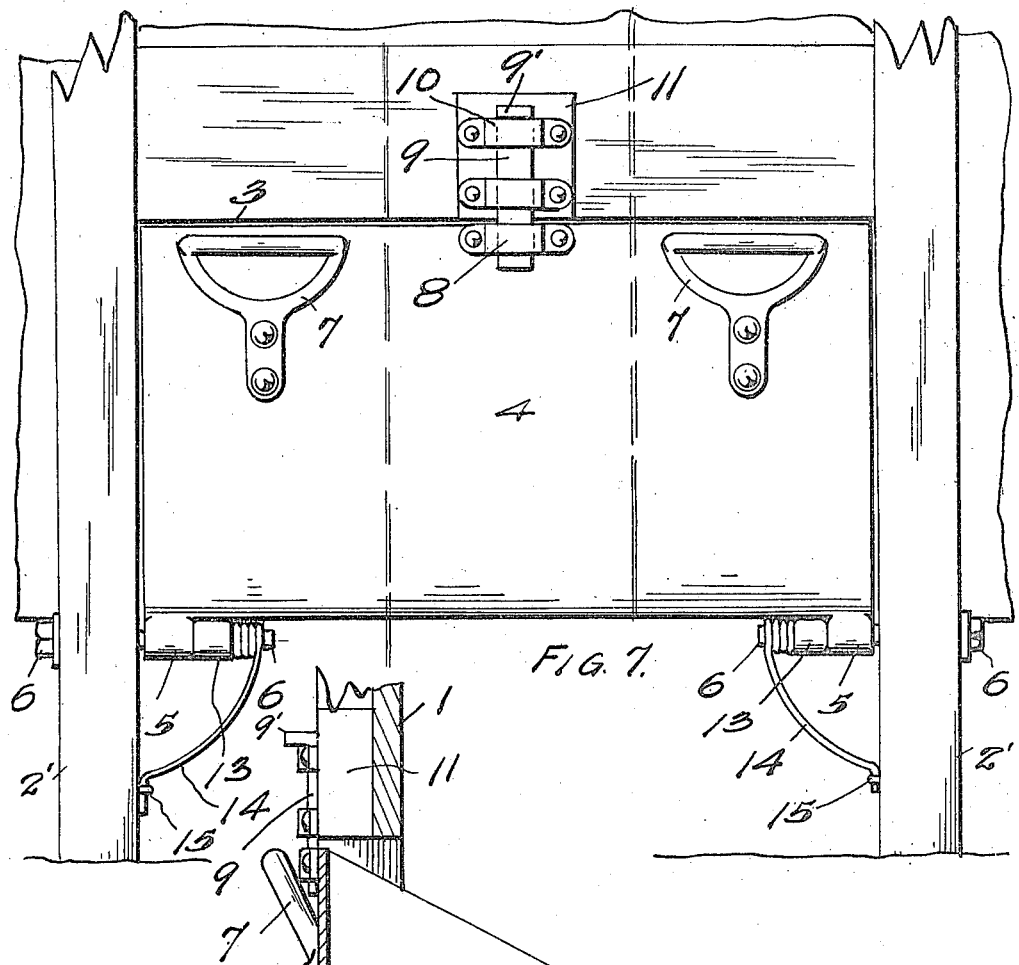
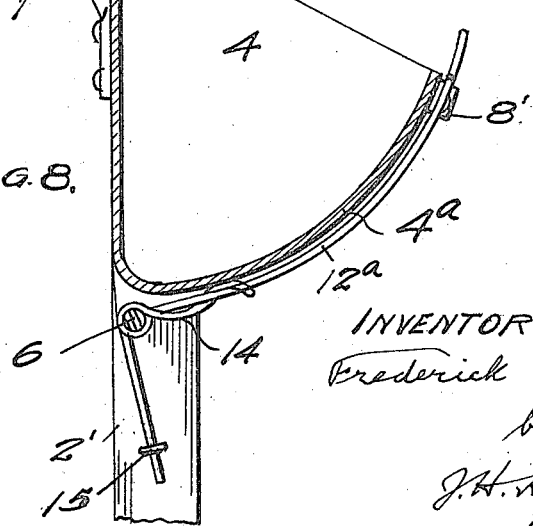

UNITED STATES PATENT OFFICE.

FREDERICK B. SEELING, OF TYLERTOWN, MISSISSIPPI.

FEED-TROUGH.

1,234,496.  Specification of Letters Patent.  Patented July 24, 1917.

Application filed January 5, 1917. Serial No. 140,680.

*To all whom it may concern:*

Be it known that I, FREDERICK B. SEELING, a citizen of the United States, residing at Tylertown, in the county of Walthall and State of Mississippi, have invented a new and useful Feed-Trough, of which the following is a specification.

My invention relates to improvements in feed troughs, and its objects are: first, to provide for filling the same without contact with the animals intended to be fed therefrom; second, to provide adjustability of said troughs relatively to said animals; third, to provide for secure closure of the troughs when not in use; fourth, to provide a suitable screen to close the opening in the wall, and prevent animals from interfering with the operation of the trough; fifth, to insure ready cleansing of the same without liability to personal injury from contact with the animals in the stalls; and sixth, to accomplish these ends with structural simplicity and economy.

I attain these ends by the device illustrated in the accompanying drawings; in which—

Figure 1 represents a side elevation of a pen or sty, with the trough in closed position; Fig. 2 is a side elevation thereof with the trough in open condition; Fig. 3 is a detached view of the screen; Fig. 4 is an enlarged vertical sectional view of the trough in closed position; Fig. 5 is a similar view, with the trough open to receive feed; Fig. 6 is a view of the trough opened full to permit emptying and cleaning; Fig. 7 is a front elevation of the trough while closed; and Fig. 8 is a modification of the trough, with a rounded side and bottom.

Similar numerals indicate corresponding parts in all the views.

The sty 1, supported by posts 2 2', has an opening 3 to receive the trough 4. Lugs 5 are perforated for hinges, moving on hinge bolts 6 6. Operating handles 7 7 are provided for pulling the trough from, and restoring it to, closed position. Sockets 8 8' serve to hold the pin 9, having head 9', while the trough is alternately in open and closed position. A screen 12 closes opening 3 when the trough is turned out, which is shown in modified form at $12^a$. A modified form of trough $4^a$ is shown on the plane of the screen hinge 13. Coiled springs 14 encircle the screen hinge, the lower ends whereof are secured to the posts 2 2' by staples 15.

The operation of my device is as follows: The trough 4 is normally closed; when needed to insert feed for the animals, it is partially opened in the arc of a circle; but when it is desired to clean the trough, then it is entirely opened so that the base, to which the handle 7 is secured, will be horizontal. The food is placed in the trough from the exterior, so that contact with the animals will be avoided.

Having thus fully described my invention, what I claim is:

In feed troughs for stock, hinged at the base to revolve in the arc of a circle, alternately to fill or cleanse, and to be emptied by the stock; a screen pivoted resiliently on said hinge, to close an opening in the sty for the movement of said trough; in combination with the sty, having said opening therein to receive the trough; and the pivoted trough mounted in said opening, provided with means of manual rotation; two counterpart sockets attached respectively to the sty and the trough; and the headed pin, slidably held in the upper socket, to lock the trough to, and release it from, the sty structure, as and for the purpose herein shown and described.

FREDERICK B. SEELING.

Copies of this patent may be obtained for five cents each, by addressing the "Commissioner of Patents, Washington, D. C."